United States Patent Office 3,271,419
Patented Sept. 6, 1966

3,271,419
PREPARATION OF FLUORO-CONTAINING
LACTONES AND UNSATURATED ACIDS
William J. Linn, Wilmington, Del., assignor to E. I. du
Pont de Nemours and Company, Wilmington, Del., a
corporation of Delaware
No Drawing. Filed July 11, 1963, Ser. No. 294,270
12 Claims. (Cl. 260—343.9)

This invention relates to a new process for preparing fluorinated carboxylic acids and their lactones. Specifically, the invention concerns a process for preparing $\alpha,\beta$-unsaturated fluorocarboxylic acids and $\beta$-fluoroalkyl lactones.

Fluorinated carboxylic acids and lactones have been known for some time. For example, 3-(trifluoromethyl)-4,4,4-trifluorocrotonic acid has been prepared by addition of ketene to hexafluoroacetone to form a lactone which is then ring-opened with fuming sulfuric acid. Also, 4-chloro-4,4-difluoro-3-(chlorodifluoromethyl)-crotonic acid has been prepared by the Knoevenagel condensation of 1,3-dichlorotetrafluoroacetone with malonic acid to form the hydroxyacid which is then dehydrated by means of phosphorus pentoxide. These methods are not as satisfactory as desired, particularly because they require two separate steps for the formation of the desired acid.

Correspondingly, it is an object of this invention to provide a simple method for the preparation of $\alpha,\beta$-unsaturated fluorinated carboxylic acids and $\beta$-fluoroalkyl lactones. It is another object to provide a one-step method for the preparation of said fluorinated acids and lactones. Other objects of the invention will become apparent as hereinafter disclosed.

The process of the invention comprises heating a haloacetone which contains at least two fluorine atoms on each of the carbons attached to the carbonyl group (i.e., the $\alpha$ and $\alpha'$ carbons) with an aliphatic carboxylic acid anhydride having two hydrogen atoms on each of the $\alpha$-carbons of the anhydride at a temperature of at least 150° C. The resulting fluorocarboxylic acids and/or fluorolactones are isolated from the reaction mixture by any convenient conventional means, e.g., fractional distillation.

Any aliphatic carboxylic acid anhydride having two hydrogens on each of the $\alpha$-carbons can be used in the process of this invention. However, because of availability and for economic reasons, anhydrides of aliphatically saturated hydrocarbyl carboxylic acids are preferred (i.e., anhydrides of hydrocarbon carboxylic acids free of aliphatic unsaturation). Of these, lower saturated unsubstituted aliphatic carboxylic acid anhydrides are most preferred, i.e., those of acids having 2–8 carbon atoms. Anhydrides of acids having more than four carbon atoms in the anhydride molecule, e.g., propionic anhydride, tend to favor the formation of the fluoroalkyllactone together with the $\alpha,\beta$-unsaturated fluorocarboxylic acid. On the other hand, acetic anhydride favors the formation of the $\alpha,\beta$-unsaturated fluorocarboxylic acids. The above-described anhydrides are commercially available.

The aliphatic acyclic fluoroketones defined previously have the general formula

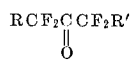

wherein R and R', which can be the same or different, are fluorine, chlorine, bromine or hydrogen. Preferably R and R' are halogen and most preferably fluorine.

The fluoroketones employed can be made by known methods. For example, their preparation is described in "Aliphatic Flourine Compounds" by Lovelace, Rausch and Postelnek, Reinhold Publishing Corporation, 1958, pp. 180–193.

The reaction, stoichiometrically, takes place between equimolar quantities of the anhydride and the ketone; consequently, it is preferred to use the two reactants in these proportions. However, such a ratio is not critical and an excess of either the anhydride or the fluoroketone can be used if desired. For example, ratios of anhydride to fluoroketone can range from 1:3 or less to 3:1 or more.

Temperatures of at least 150° C. are required to obtain reaction between the fluoroketone and the carboxylic acid anhydride; however, the reaction temperature should be maintained below the temperature at which degradation of the reactants or products takes place. Reaction temperatures of 150–300° C. are usually satisfactory, but temperatures of 175–250° C. are preferred.

The pressure under which the reaction is carried out is not critical. It can be carried out at atmospheric or superatmospheric pressure. A convenient method of carrying out the reaction under pressure is to conduct it in a closed reaction vessel at the autogenous pressure developed by the reaction mixture at the operating temperature.

The reaction time can be varied widely and depends in part on the particular reaction temperature and particular reactants being employed. In general, the use of the lower reaction temperatures in the above-specified range requires a longer reaction time. The non-criticality of the reaction time is exemplified by the fact reaction times of 1–24 hours are satisfactory, even in the temperature range of 150–300° C.

The reaction between the carboxylic acid anhydride and the fluoroketone can be carried out in the absence of any solvent or reaction medium. However, inert reaction media, i.e., those that contain no hydroxyl group, can be used if desired. Reaction media that are suitable include ethers, e.g., tetrahydrofuran, dioxane, or ethylene glycol dimethyl ether; and halocarbons, e.g., carbon tetrachloride.

The reaction is illustrated in greater detail but is not to be considered limited by the following examples for obvious modifications will occur to those skilled in the art. The proportions of ingredients in the examples are expressed in parts by weight unless otherwise specified.

EXAMPLE 1

*Reaction of 1,3-dichlorotetrafluoroacetone with acetic anhydride*

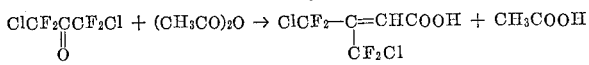

A mixture of 10 parts of 1,3-dichlorotetrafluoroacetone and 5.1 parts of acetic anhydride is sealed in a heavy-walled glass tube and heated for 10 hours at 200° C. The liquid reaction product is removed and distilled to give 9.7 parts (80% of theory) of a colorless liquid boiling at 110–116° C. at 22 mm. Hg.

The products from a number of runs carried out as described in the preceding paragraph are combined and redistilled. There is obtained 4-chloro-4,4-difluoro-3-(chlorodifluoromethyl)crotonic acid, B.P. 96° C. at 9 mm.

*Anal.*—Calc'd for $C_5H_2Cl_2F_4O_2$: C, 25.13%; H, 0.84%; F, 31.80%. Found: C, 25.30%; H, 0.93%; F, 31.42%.

The structure of the product is further confirmed by the infrared absorption spectrum and the proton magnetic resonance spectrum exhibited by the product.

EXAMPLE 2

*Reaction of hexafluoroacetone with acetic anhydride*

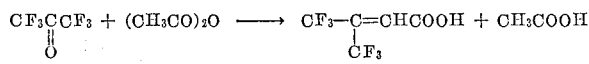

A mixture of 10.2 parts of acetic anhydride and 25.5 parts of hexafluoroacetone (85% pure) is sealed in a heavy-walled glass tube and heated for 10 hours at 200° C. The tube is cooled, opened, and the liquid product is distilled. After a forerun of 7.2 parts, B.P. 105–147° C. at atmospheric pressure, there is collected a second fraction, 19.0 parts, B.P. 147° C. at atmospheric pressure to 180° C. at 50 mm. There is also obtained 5.5 parts of higher boiling material. The second fraction is carefully fractionated and there is obtained 14.4 parts of colorless liquid, B.P. 90° C. at 51 mm., $n_D^{25}$, 1.3353, which is 3-(trifluoromethyl)-4,4,4-trifluorocrotonic acid.

*Analysis.*—Calc'd for $C_5H_2F_6O_2$: C, 28.85%; H, 0.97%; F, 54.73%. Found: C, 29.14%; H, 1.14%; F, 54.46%.

The infrared absorption spectrum for this product shows a band at 5.77 microns for the carboxylic acid function and at 5.95 microns for the double bond. The $F^{19}$ nuclear magnetic resonance pattern obtained at 56.4 mc. is consistent with the proposed structure.

EXAMPLE 3

*Reaction of 1,3-dichlorotetrafluoroacetone with propionic anhydride*

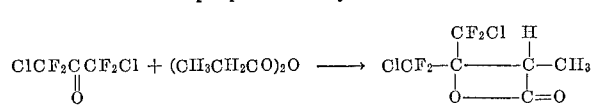

In each of two heavy-walled glass tubes, there is sealed a mixture of 15 parts of 1,3-dichlorotetrafluoroacetone and 9.7 parts of freshly distilled propionic anhydride. The tubes are heated for 10 hours at 200° C., then chilled and opened. The contents are combined and distilled. After a forerun of 12.2 parts, B.P. 67–85° C. at 49 mm., there is collected 23.3 parts of colorless liquid, B.P. 85–89.5° C. at 51 mm. The last 17.9 parts of this fraction is collected in four cuts that have a constant boiling point and refractive index, but the elemental analysis and nuclear magnetic resonance spectrum indicate that this fraction is a mixture of product with propionic anhydride. This latter fraction is then shaken with 5% sodium hydroxide solution and allowed to stand 30 minutes with occasional shaking. The lower layer is drawn off, washed with water, dried, and distilled, and there is obtained 11.9 parts (31% of theory) of α-methyl-β,β-bis-(chlorodifluoromethyl)-β-propiolactone, B.P. 87.5–88° C. at 46 mm., $n_D^{25}$, 1.3957.

*Analysis.*—Calc'd for $C_6H_4Cl_2F_4O_2$: C, 28.27%; H, 1.58%; F, 29.81%. Found: C, 28.49%; H, 1.82%; F, 30.09%.

The infrared absorption spectrum shows absorption for saturated C–H at 3.37 and 3.46 microns and a band associated with the lactone carbonyl at 5.27 microns. The $F^{19}$ nuclear magnetic resonance spectrum confirms the proposed structure.

EXAMPLE 4

*Reaction of hexafluoroacetone with propionic anhydride*

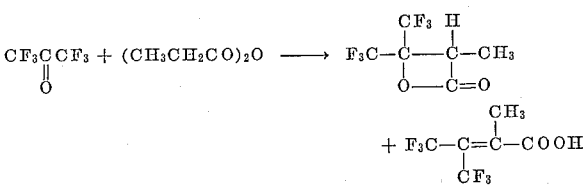

A mixture of 26 parts of propionic anhydride and 35 parts of hexafluoroacetone is heated in a shaker tube lined with the corrosion resistant alloy known as "Hastelloy" for 16 hours at 200° C. The reaction product is removed from the cooled shaker tube and distilled. There are obtained two fractions (A) 31.9 parts of colorless liquid, B.P. 59° C. at 156 mm. to 99.5° C. at 51 mm. and (B) 14.2 parts (32% of theory) of colorless liquid, B.P. 105° C. at 48 mm. Fraction (B) crystallizes and the solid has a melting point of 58–60° C. This solid is redistilled, B.P. 103–104° C. at 46 mm., and is 4,4,4-trifluoro-2-methyl-3-(trifluoromethyl)crotonic acid.

*Analysis.*—Calc'd for $C_6H_4F_6O_2$: C, 32.45%; H, 1.81%; F, 51.33%. Found: C, 32.77%; H, 1.80%; F, 51.26%.

The infrared absorption spectrum substantiates the carboxylic acid structure. There is broad absorption at 3–4 microns, and absorption at 5.80 and 5.97 microns for the carboxyl group and double bond, respectively.

Fraction (A) is shaken with cold aqueous 5% sodium hydroxide solution and after the mixture has stood for 20 minutes the lower layer is drawn off, washed with water, dried, and distilled. There is obtained 11.4 parts (26% of theory) of a colorless liquid boiling at 58° C. at 124 mm., $n_D^{25}$, 1.3218. This product is α-methyl-β,β-bis(trifluoromethyl)-β-propiolactone.

*Analysis.*—Calc'd for $C_6H_4F_6O_2$: C, 32.45%; H, 1.81%; F, 51.33%. Found: C, 32.62%; H, 2.03%; F, 50.82%.

The infrared absorption spectrum is consistent with the lactone structure, showing absorption at 3.37 and 3.45 microns for saturated C—H, and at 5.21 and 5.34 microns for the lactone carbonyl. The proton magnetic resonance spectrum is comparable to that of the lactone formed from 1,2-dichlorotetrafluoroacetone and propionic anhydride described in Example 3.

Although the examples have illustrated the process of this invention by the use of specific anhydrides and haloketones, the reaction can be carried out with any carboxylic acid anhydride and any haloketone having the formula given hereinbefore. Specific examples of other carboxylic acid anhydrides and other acyclic fluoroketones containing two fluorine atoms on each of the carbon atoms attached to the carbonyl group which can be reacted by the method described in the examples to give α,β-unsaturated fluorocarboxylic acids and fluorolactones are listed in the following Table I.

TABLE I.—REACTION OF FLUOROKETONES WITH CARBOXYLIC ANHYDRIDES

| Reactants | | Products |
|---|---|---|
| Fluoroketone | Carboxylic Acid Anhydride | Fluoroacid and/or Fluorolactone |
| $CF_3\underset{\underset{O}{\|}}{C}CHF_2$ | $[CH_3(CH_2)_6CO]_2O$ | $CF_3-\underset{\underset{CHF_2}{\|}}{C}=\overset{\overset{(CH_2)_5CH_3}{\|}}{C}-COOH \;+\; CF_3-\underset{\underset{O\text{---}C=O}{\|}}{C}-\overset{\overset{CHF_2\;\;H}{\|\;\;\;\;\|}}{C}(CH_2)_5CH_3$ |
| $CF_2Br\underset{\underset{O}{\|}}{C}CF_2Br$ | $(CH_3CO)_2O$ | $CF_2Br-\underset{\underset{CF_2Br}{\|}}{\overset{\overset{H}{\|}}{C}}-COOH$ |
| $HCF_2\underset{\underset{O}{\|}}{C}CF_2H$ | $[CH_3(CH_2)CO]_2O$ | $CF_2H-\underset{\underset{CF_2H}{\|}}{C}=\overset{\overset{CH_2CH_3}{\|}}{C}-COOH \;+\; CF_2H-\underset{\underset{O\text{---}C=O}{\|}}{C}-\overset{\overset{CF_2H\;\;H}{\|\;\;\;\;\|}}{C}-CH_2CH_3$ |
| $ClCF_2\underset{\underset{O}{\|}}{C}CF_2Cl$ | $(C_6H_5CH_2CO)_2O$ | $ClCF_2-\underset{\underset{CF_2Cl}{\|}}{C}=\overset{\overset{C_6H_5}{\|}}{C}-CO_2H \;+\; ClCF_2-\underset{\underset{O\text{---}C=O}{\|}}{C}-\overset{\overset{CF_2Cl\;\;C_6H_5}{\|\;\;\;\;\;\;\;\;\|}}{C}-H$ |

The α,β-unsaturated polyfluoroacids and fluorolactones obtained by the process of this invention are useful as chemical intermediates. Both the acids and the lactones can be decarboxylated to the corresponding fluoroolefins. For example, β,β-trifluoromethyl-β-propiolactone heated to 340–350° C. decomposes into carbon dioxide and 3,3,3-trifluoro-2-(trifluoromethyl)propene. The resulting fluoroolefins are capable of being polymerized by addition polymerization to polymers useful as coating compositions, self-supporting films, and the like.

The lactones produced by this process or prepared from the acids of this process are also useful for polymerization to solid or semisolid polymers. For example, β,β-bis-(trifluoromethyl)-β-propiolactone in the presence of sodium or traces of tertiary amines at room temperature for several days polymerizes to solid and semisolid polymers which soften at low temperatures.

The foregoing detailed description has been given for clearness of understanding only and no unnecessary limitations are to be understood therefrom. As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing at least one member of the class consisting of fluorinated carboxylic acids and their lactones which comprises reacting a haloacetone which contains at least two fluorine atoms on each of the carbons attached to the carbonyl group of the acetone, with an aliphatically saturated hydrocarbyl carboxylic acid anhydride at a temperature of at least 150° C.

2. A process for preparing at least one member of the class consisting of fluorinated carboxylic acids and their lactones which comprises reacting a ketone of the formula

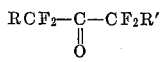

wherein R and R' each are selected from the class consisting of fluorine, chlorine, bromine and hydrogen, with an anhydride of an aliphatically saturated hydrocarbyl carboxylic acid having from 2 to 8 carbon atoms inclusive at a temperature of at least 150° C.

3. The process of claim 2 wherein the temperature is from 150° C. to 300° C.

4. The process of claim 2 wherein R and R' are fluorine.

5. The process of claim 2 wherein R and R' are chlorine.

6. The process of claim 2 wherein R and R' are bromine.

7. The process of claim 2 wherein R and R' are hydrogen.

8. The process of claim 2 carried out in a solvent inert to the reactants and the products.

9. A process for preparing a member of the group consisting of a fluorinated carboxylic acid and its lactone which comprises reacting hexafluoroacetone with propionic anhydride at a temperature of at least 150° C.

10. A process for preparing a member of the group consisting of a fluorinated carboxylic acid and its lactone which comprises reacting 1,3-dichlorotetrafluoroacetone with propionic anhydride at a temperature of at least 150° C.

11. A process for preparing a fluorinated carboxylic acid which comprises reacting hexafluoroacetone with acetic anhydride at a temperature of at least 150° C.

12. A process for preparing a fluorinated carboxylic acid which comprises reacting 1,3-dichlorotetrafluoroacetone with acetic anhydride at a temperature of at least 150° C.

References Cited by the Applicant

E. D. McBee, Y. S. Kim and H. P. Braendlin, J. Am. Chem. Soc. 84, 3154 (1962).

I. L. Knunyants and Yu A. Cheburkov, Bull. Acad. of Sci., Div. Chemical Sciences (English translation), 1960, 640–6.

"Organic Reactions," vol. I (1942), p. 210 to 265.

WALTER A. MODANCE, *Primary Examiner*.

JAMES A. PATTEN, *Assistant Examiner*.